United States Patent
Posch et al.

(10) Patent No.: US 9,541,075 B2
(45) Date of Patent: Jan. 10, 2017

(54) MASTER CYLINDER FOR A MOTOR VEHICLE HYDRAULIC BRAKE SYSTEM

(75) Inventors: Volker Posch, Kirchhain (DE); Harald König, Ober-Mörlen (DE); Udo Jungmann, Mörfelden (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 840 days.

(21) Appl. No.: 13/695,451

(22) PCT Filed: Apr. 28, 2011

(86) PCT No.: PCT/EP2011/056727
§ 371 (c)(1),
(2), (4) Date: Apr. 17, 2013

(87) PCT Pub. No.: WO2011/138220
PCT Pub. Date: Nov. 10, 2011

(65) Prior Publication Data
US 2013/0205772 A1  Aug. 15, 2013

(30) Foreign Application Priority Data
May 4, 2010  (DE) ........................ 10 2010 028 531

(51) Int. Cl.
*B60T 11/08* (2006.01)
*F04B 13/00* (2006.01)
(Continued)

(52) U.S. Cl.
CPC ................ *F04B 13/00* (2013.01); *B60T 11/20* (2013.01); *B60T 11/232* (2013.01)

(58) Field of Classification Search
CPC ......... B60T 11/232; B60T 11/16; B60T 11/20; B60T 11/203; B60T 11/22; B60T 11/236; B60T 11/228
See application file for complete search history.

(56) References Cited

U.S. PATENT DOCUMENTS

| | | | | |
|---|---|---|---|---|
| 4,208,881 A | * | 6/1980 | Brademeyer | ......... B60T 11/224 137/513.7 |
| 6,014,862 A | * | 1/2000 | Shaw | ...................... B60T 7/042 60/533 |

(Continued)

FOREIGN PATENT DOCUMENTS

| | | |
|---|---|---|
| CN | 101062681 A | 10/2007 |
| DE | 1 928 849 | 12/1970 |
| WO | WO 2005/066005 A1 | 7/2005 |

OTHER PUBLICATIONS

International Search Report for PCT Application No. PCT/EP2011/056727 mailed Oct. 7, 2011.

(Continued)

*Primary Examiner* — Michael Leslie
*Assistant Examiner* — Dustin T Nguyen
(74) *Attorney, Agent, or Firm* — RatnerPrestia

(57) ABSTRACT

A motor vehicle hydraulic brake system master cylinder, having at least one piston which is arranged in a housing and displaceable along an axis as a result of brake actuation and to which a pressure chamber which can be connected to wheel brakes, and a refill chamber is assigned, wherein the pressure chamber in the non-actuated state can be connected to a fluid reservoir via a compensating bore and on actuation of the brake can be isolated therefrom by means of a cup seal arranged on the piston in order to build up pressure. The master cylinder having a cup seal arranged in a radially open, encircling groove of the piston which groove is formed by a first and a second radially encircling projection, wherein when the brake actuation is released additional fluid is drawn from the refill chamber in the direction of the pressure chamber via the second projection.

10 Claims, 3 Drawing Sheets

(51) Int. Cl.
*B60T 11/20* (2006.01)
*B60T 11/232* (2006.01)

(56) References Cited

U.S. PATENT DOCUMENTS

| | | | |
|---|---|---|---|
| 6,276,137 B1 * | 8/2001 | Kottmyer | B60T 8/38 60/454 |
| 2003/0213240 A1 | 11/2003 | Nix et al. | |
| 2005/0016174 A1 | 1/2005 | Tsubouchi et al. | |
| 2005/0115237 A1 | 6/2005 | Tsubouchi et al. | |

OTHER PUBLICATIONS

First Office Action of Chinese Application No. 201180021977.6 dated May 5, 2014.

* cited by examiner

MASTER CYLINDER FOR A MOTOR VEHICLE HYDRAULIC BRAKE SYSTEM

CROSS REFERENCE TO RELATED APPLICATIONS

This application is the U.S. National Phase Application of PCT/EP2011/056727, filed Apr. 28, 2011, which claims priority to German Patent Application No. DE 10 2010 028 531.5, filed May 4, 2010, the contents of such applications being incorporated by reference herein.

FIELD OF THE INVENTION

The invention relates to a master cylinder for a motor vehicle hydraulic brake system, having at least one piston, which is arranged in a housing so that it is displaceable along an axis as a result of a brake actuation and to which a pressure chamber, which can be connected to wheel brakes, and a refill chamber is assigned, wherein the pressure chamber, in the non-actuated state, can be connected to a fluid reservoir via a compensating bore and on actuation of the brake can be isolated therefrom by means of a cup seal arranged on the piston in order to build up pressure, and the refill chamber is connected to the fluid reservoir via a refill bore, wherein the cup seal, on actuation of the brake, seals off the pressure chamber in the direction of the refill chamber and when the brake actuation is released allows additional fluid to be drawn from the refill chamber in the direction of the pressure chamber.

BACKGROUND OF THE INVENTION

Such a so-called relief-port master cylinder is disclosed, for example, by DE 19 28 849 A1, which is incorporated by reference. The two pistons of the master cylinder have axial compensating bores through which, when the brake actuation is released, fluid is drawn from the refill chamber in the direction of the pressure chamber. For this purpose a sealing lip of the cup seal is pressed inward, so that the fluid can flow over the sealing lip. A filling plate, which protects the cup seal from damage, is furthermore arranged between the piston and the cup seal. The filling plate tilts inward with the cup seal and fluid likewise flows over it when the brake actuation is released.

SUMMARY OF THE INVENTION

There is a general endeavor to design simpler and more cost-effective vehicle components. An aim of the invention therefore is to provide a master cylinder which is easier and more cost-effective to produce.

According to an aspect of the invention this is achieved by a cup seal arranged in a radially open, encircling groove of the piston, which groove is formed by a first and a second radially encircling projection, wherein, when the brake actuation is released, additional fluid is drawn from the refill chamber in the direction of the pressure chamber via the second projection. This makes it possible to dispense with the axial compensating bore of the piston, allowing a simplified piston contour.

BRIEF DESCRIPTION OF THE DRAWINGS

The invention is best understood from the following detailed description when read in connection with the accompanying drawing. Included in the drawing is the following figure.

DETAILED DESCRIPTION OF THE INVENTION

Figure 1:
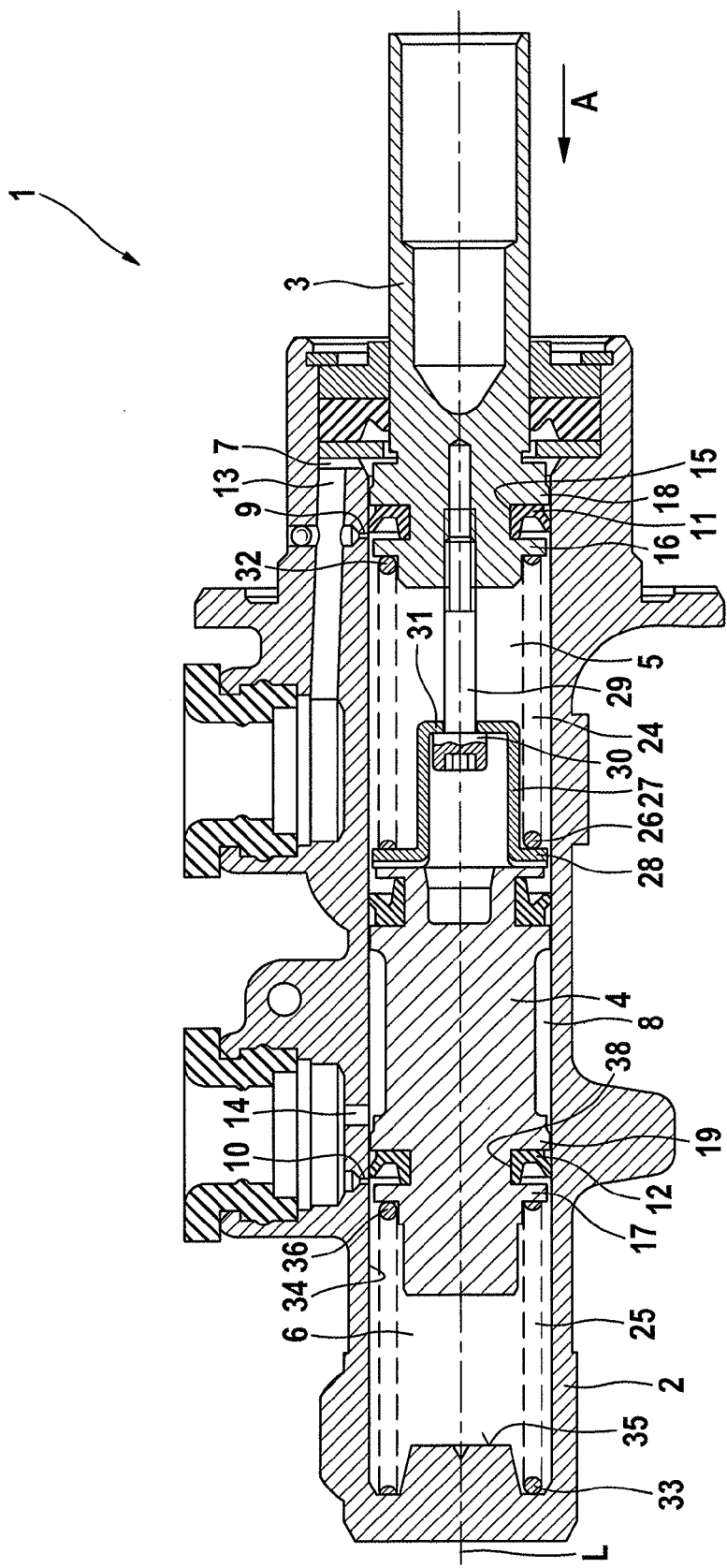
FIG. 1 shows a master cylinder according to the invention in longitudinal section.

FIG. 1 in longitudinal section shows a master cylinder 1 according to the invention for a motor vehicle hydraulic brake system, which may be embodied as a single-circuit master cylinder or, as represented in the exemplary embodiment, as a dual-circuit or tandem master cylinder.

The master cylinder 1 in the exemplary embodiment comprises a first piston 3 and a second piston 4, which are arranged in a housing 2 so that they are displaceable along an axis L as a result of a brake actuation and to which pressure chambers 5, 6, which can be connected to wheel brakes, and refill chambers 7, 8 are assigned.

In a non-actuated state of the master cylinder 1 the pressure chambers 5, 6 can each be connected via a compensating bore 9, 10, the so-called relief port, to a fluid reservoir (not shown). On actuation of the master cylinder 1 in the actuating direction A, the pressure chambers 5, 6 can be isolated from the fluid reservoir by means of cup seals 11, 12 arranged on the pistons 3, 4. The refill chambers 7, 8 are connected to the fluid reservoir via refill bores 13, 14 formed in the housing 2.

As can be seen from FIG. 1, the cup seals 11, 12 are each arranged in a radially open encircling groove 15, 38 of the piston 3, 4, which is formed by a first and a second radially encircling projection 16, 17, 18, 19.

Figure 2:
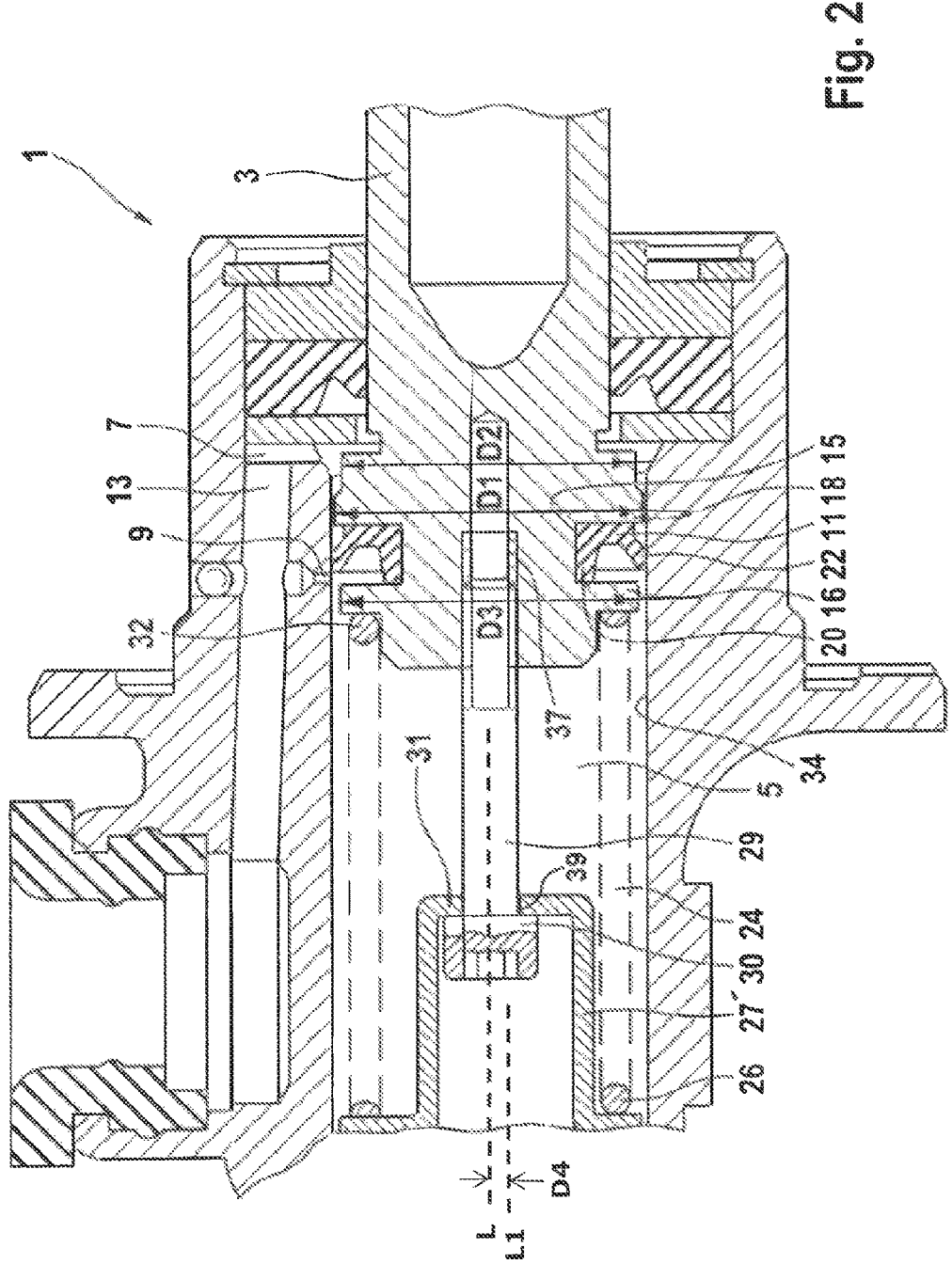
FIG. 2 shows a first enlarged detail of the master cylinder according to FIGS. 1
Figure 3:
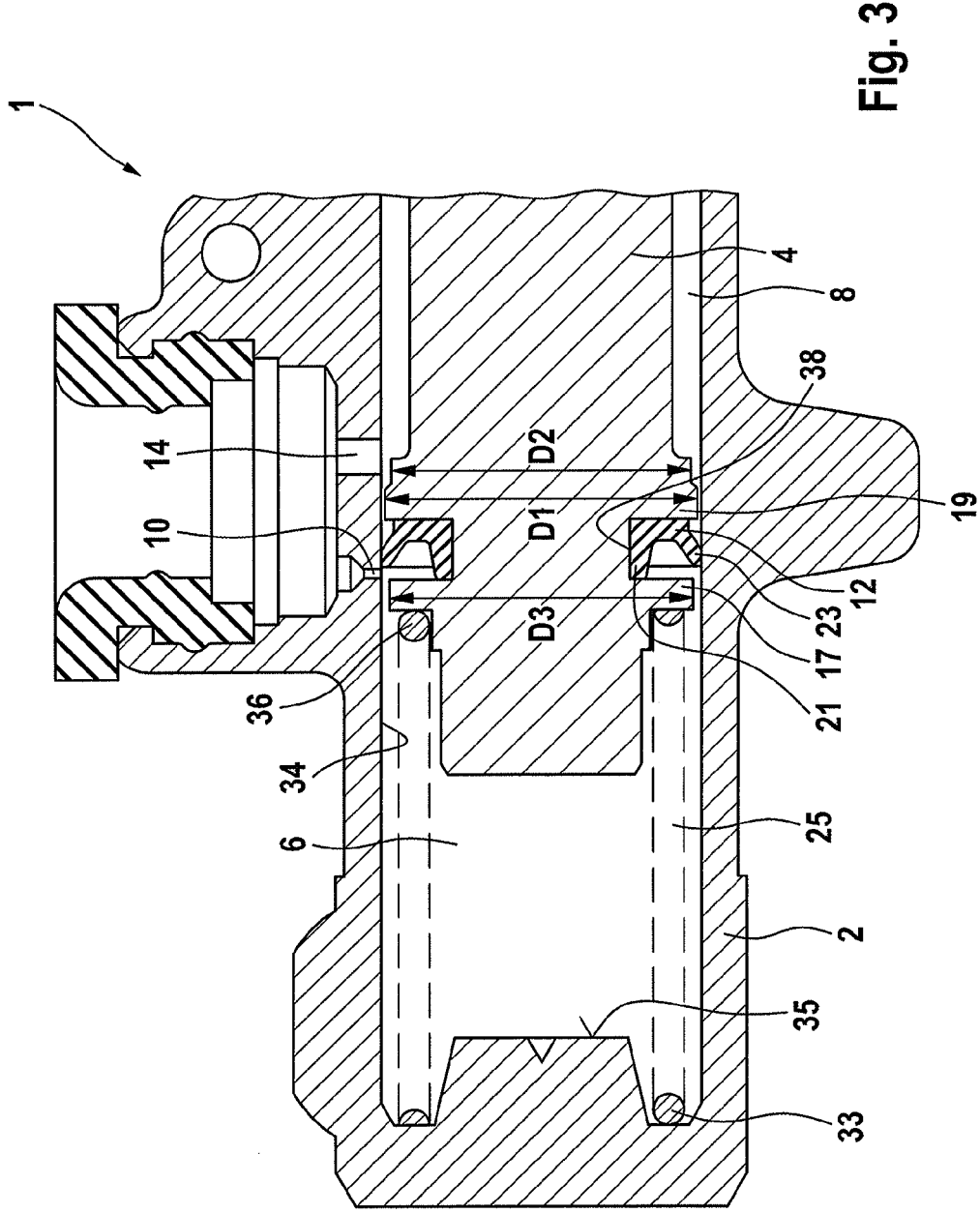
FIG. 3 shows a second enlarged detail of the master cylinder according to FIG. 1.

FIGS. 2 and 3 show a first and a second enlarged detail of the master cylinder 1. It can be seen that the cup seals 11, 12 each comprise an inner sealing lip 20, 21, subject to static impingement, and an outer sealing lip 22, 23, subject to dynamic impingement, the outer sealing lip 22, 23 bearing tightly against a bore 34 of the housing 2.

A return spring 24, 25 is assigned to each piston 3, 4. The return spring 24 of the first piston 3 is supported by a first end 26 on a radially outward-facing projection 28 of a sleeve 27, through which a screw element 29 passes. The self-locking screw element 29 is screwed into a tapped hole 37 of the first piston 3, so that on compression of the return spring 24 the sleeve 27 is capable of telescoping relative to the screw element 29. A second end 32 of the return spring 24 furthermore bears against the first projection 16 of the first piston 3, so that a spring support sleeve usual in known master cylinders can be dispensed with.

Since a screw head 30 of the screw element bears on a radially inward-facing projection 31 of the sleeve 27, the maximum extension of the return spring 24 is fixed and the return spring 24 forms a captive unit together with the first piston 3. As shown in FIG. 2, a cup-shaped member 27' of the sleeve 27 includes an opening 39 that is slidably connected to the screw element 29. A central longitudinal axis L1 of the cup-shaped member 27' is radially offset from a central longitudinal axis L of the screw element 29 by a predetermined distance D4. The central longitudinal axis L1 of the cup-shaped member 27' is also radially offset from a central longitudinal axis 'L' of the spring 24 by the predetermined distance D4. The opening 39 in the sleeve 27 is radially offset from the central longitudinal axis L1 of the cup-shaped member 27' by the predetermined distance D4.

The return spring 25 of the second piston 4 is supported by a first end 33 on a base 35 of the bore 34 and by a second end 36 on the first projection 17 of the second piston 4. Here too, the direct support for the return spring 25 on the piston projection means that a separate spring support sleeve can be dispensed with.

For braking actuation of the master cylinder 1, the first piston 3 is displaced in actuating direction A. In so doing the movement of the first piston 3 is transmitted to the second piston 4 via the return spring 24 and the sleeve 27. As soon as the outer sealing lips 22, 23 of the cup seals 11, 12 are situated in the area of the compensating bores 9, 10, that is to say they have run over the controlling bore side-edge, the so-called idle travel of the master cylinder 1 will have been covered, since fluid can no longer get into the pressure chambers 5, 6 from the fluid reservoir via the compensating bores 9, 10. The connection of the pressure chambers 5, 6 to the fluid reservoir is interrupted. Since the outer sealing lips 22, 23 also seal off the pressure chambers 5, 6 in the direction of the refill chambers 7, 8, pressure can be built up in the pressure chambers 5, 6.

When the brake actuation is released, the pistons 3, 4 are pushed back counter to the actuating direction A by the return springs 24, 25. Here, when the brake actuation is released rapidly, for example, a vacuum may occur in the pressure chambers 5, 6, so that fluid is drawn from the refill chambers 7, 8 over the second projection 18, 19 in the direction of the pressure chambers 5, 6. The outer sealing lip 22, 23 is pressed inward by the vacuum, allowing fluid to flow over the second projection 18, 19.

As can be seen from FIGS. 2 and 3, the second projection 18, 19 is stepped and has a first diameter D1 and a second diameter D2, which is smaller than D1.

The diameter D1 is of a dimension such that it allows fluid to overflow and at the same time ensures that the piston 3, 4 is guided in the bore 34. Axial compensating bores of the pistons 3, 4 can thereby be dispensed with, so that the pistons 3, 4 can be produced with a simplified piston contour and more cost-effectively.

The stepped design of the second projection 19 has the further advantage that in contrast to a piston having axial compensating bores the second piston 4 can be of shortened design. This shortening of the piston 4 is possible, since in the non-actuated position of the master cylinder 1 shown, the second projection 19 with its smaller diameter D2 can be arranged in the area of the refill bore 14, without adversely affecting the suction of additional fluid via the refill bore 14. Shortening the second piston 4 also makes it possible to use a shorter housing 2 for the master cylinder 1. This affords material savings and improves the packaging.

In the area of the first projection 16, 17 the piston 3, 4 in each case has a diameter D3, which is of a dimension such that the return spring 24, 25 can bear against this and the overflow of fluid in the direction of the pressure chamber 5, 6 is not adversely affected.

List of Reference Numerals 1 master cylinder
2 housing
3 piston
4 piston
5 pressure chamber
6 pressure chamber
7 refill chamber
8 refill chamber
9 compensating bore
10 compensating bore
11 cup seal
12 cup seal
13 refill bore
14 refill bore
15 groove
16 projection
17 projection
18 projection
19 projection
20 inner sealing lip
21 inner sealing lip
22 outer sealing lip
23 outer sealing lip
24 return spring
25 return spring
26 end
27 sleeve
28 projection
29 screw element
30 screw head
31 projection
32 end
33 end
34 bore
35 base
36 end
37 tapped hole
38 groove
A actuating direction
L axis
D1 diameter
D2 diameter
D3 diameter
D4 Predetermined distance
27' Cup-shaped member
39 Opening
L1 Central longitudinal axis

The invention claimed is:

1. A master cylinder for a motor vehicle hydraulic brake system, having at least one piston, which is arranged in a housing so that it is displaceable along a central axis of the housing as a result of a brake actuation and to which a pressure chamber, which can be connected to wheel brakes, and a refill chamber is assigned,
    wherein the pressure chamber in the non-actuated state can be connected to a fluid reservoir via a compensating bore and on actuation of the brake can be isolated therefrom by means of a cup seal arranged on the piston in order to build up pressure, and the refill chamber is connected to the fluid reservoir via a refill bore,
    wherein the cup seal, on actuation of the brake, seals of the pressure chamber in the direction of the refill chamber and when the brake actuation is released allows additional fluid to be drawn from the refill chamber in the direction of the pressure chamber,
    wherein the cup seal is arranged in a radially open, encircling groove of the piston, which groove is formed by a first radially encircling projection and a second radially encircling projection,
    wherein when the brake actuation is released additional fluid is drawn from the refill chamber in the direction of the pressure chamber via the second projection,
    wherein the piston forms a captive unit with (i) a sleeve that is slidably connected to a screw element that is threadedly fastened to a threaded opening in the piston, and (ii) a return spring positioned between the piston and the sleeve to bias the sleeve away from the piston, and wherein the screw element is positioned through an opening in the sleeve such that the sleeve is configured to telescope relative to the screw element upon actuation of the brake, and a head of the screw element is configured to bear on the sleeve in the non-actuated state of the brake, and wherein the sleeve comprises a radially outward projection, upon which the return spring is mounted, and a cup-shaped member extending from the radially outward projection, wherein the cup-shaped member includes the opening in the sleeve that is slidably connected to the screw element, and wherein a central longitudinal axis of the cup-shaped member is radially offset from a central longitudinal axis of the screw element by a predetermined distance.

2. The master cylinder as claimed in claim 1, wherein the first projection is intended to bear against the return spring for the piston arranged in the pressure chamber.

3. The master cylinder as claimed in claim 2, wherein the second projection is stepped.

4. The master cylinder as claimed in claim 3, wherein the second projection has a first diameter and a second diameter, the second diameter being smaller than the first diameter.

5. The master cylinder as claimed in claim 4, wherein in the non-actuated position of the master cylinder the second projection is arranged with its second diameter in the area of the refill bore.

6. The master cylinder as claimed in claim 1, wherein the second projection is stepped.

7. The master cylinder as claimed in claim 1, wherein the central longitudinal axis of the cup-shaped member is radially offset from a central longitudinal axis of the spring by the predetermined distance.

8. The master cylinder as claimed in claim 1, wherein the opening in the sleeve is radially offset from the central longitudinal axis of the cup-shaped member of the sleeve by the predetermined distance.

9. The master cylinder as claimed in claim 7, wherein the central longitudinal axis of the spring is aligned with the central axis of the housing.

10. The master cylinder as claimed in claim 1, wherein the central longitudinal axis of the screw element is aligned with the central axis of the housing.

* * * * *